United States Patent [19]
Diaz

[11] Patent Number: 4,872,100
[45] Date of Patent: Oct. 3, 1989

[54] HIGH VOLTAGE DC TO AC CONVERTER

[75] Inventor: Bonifacio Diaz, El Paso, Tex.

[73] Assignee: Zenith Electronics Corporation, Glenview, Ill.

[21] Appl. No.: 256,872

[22] Filed: Oct. 12, 1988

[51] Int. Cl.[4] .......................................... H02M 7/538
[52] U.S. Cl. ....................................... 363/41; 330/10; 363/49; 363/56; 363/79; 363/98; 363/132
[58] Field of Search ................... 323/272; 330/10/251; 363/41, 79, 80, 98, 49, 56, 132

[56] References Cited

U.S. PATENT DOCUMENTS

| 3,879,647 | 4/1975 | Hamilton et al. | |
| 4,347,558 | 8/1982 | Kalinsky | 363/17 |
| 4,479,175 | 10/1984 | Gille et al. | 363/41 |
| 4,533,986 | 8/1985 | Jones | 363/98 |
| 4,571,551 | 2/1986 | Trager | 380/251 |
| 4,586,119 | 4/1986 | Sutton | |
| 4,694,386 | 9/1987 | de Sarte | |
| 4,714,978 | 12/1987 | Coleman | |
| 4,717,994 | 1/1988 | Diaz et al. | |
| 4,729,085 | 3/1988 | Truskalo | 363/17 |
| 4,758,940 | 7/1988 | Steigerwald | 363/17 |

FOREIGN PATENT DOCUMENTS 52383 3/1982 Japan ..................................... 363/98

OTHER PUBLICATIONS

Cuk & Erickson, "A Conceptually New High-Frequency Switched-Mode Power Amplifier Technique Eliminates Current Ripple", from Proceedings of Powercon 5, May 4-6, 1978, pp. 401-422.

Primary Examiner—William H. Beha, Jr.

[57] ABSTRACT

A four-quadrant buck converter is described having a common leg of an inductor in series with an output capacitor, one power supply for providing a positive voltage output signal and negative voltage output signal to two solid-state switches joined at a common node, an output transformer whose primary is connected across the output capacitor and a pulse width modulated control circuit for operating the switches to produce a predetermined voltage across said output capacitor and for regulating the current out of the transformer. The control circuitry operates in response to a voltage signal from the output of the power supply, a voltage representative of the voltage at the output of the converter, a high frequency ramp voltage, an internal oscillator, and a voltage representative of the RMS current flowing on the secondary side of the output transformer. The converter incorporates overcurrent protection, an undervoltage lockout, overshoot protection, a slow start-up, inexpensive RMS conversion and other useful functions and capabilities.

53 Claims, 7 Drawing Sheets

HIGH VOLTAGE DC TO AC CONVERTER

TECHNICAL FIELD

This invention is related to the general subject of power supplies and, in particular, to the subject of switch-mode power converters.

BACKGROUND OF THE INVENTION

Part of the xerography copying process requires a high voltage AC power supply provided by a switch mode power converter. Typically, a high voltage quasi-square waveform is generated using push-pull circuitry and then filtered by an inductor-capacitor low pass filter network (i.e., 500 Hz); U.S. Pat. No. 4,714,978 is an example. The resultant waveform is a distorted sinusoid. Usually, the output frequency of the AC converter is limited to around 400 Hz, due to the inherent losses in the xerography process. A pure sinewave is preferred for low noise content. As the duty cycle of the quasi-square waveform is varied, the distorted sinusoid varies in amplitude; unfortunately, the distortion content also varies. The voltage amplitude is varied by control circuitry to keep a regulated output current. A regulated current is preferred to insure uniform copy quality. This is all the more desirable since current is affected by the age of the components, temperature conditions, dirt, etc.

One modern converter which operates over a 50 percent duty cycle is described in Diaz et al U.S. Pat. No. 4,717,994 (and assigned to the assignee of the present invention). The control and operation of conventional switched-mode power supplies is covered in the paper "Conceptually New High-Frequency Switched-Mode Power Amplifier Technique Eliminates Current Ripple", by Cuk and Erickson, *Proceedings of POWERCON FIVE*, May 4-6, 1978. de Sartre U.S. Pat. Nos. 4,694,386 and Murakami et al U.S. Pat. No. 4,195,335 describe power supplies which provide automatic start-up. Hamilton et al U.S. Pat. No. 3,879,647 describes a converter having a soft start capability. Finally, Sutton U.S. Pat. No. 4,586,119, describes a switching mode power supply which employs current and voltage feedback and sensing.

SUMMARY OF THE INVENTION

In accordance with the present invention, a unique four-quadrant high voltage DC to AC buck converter is described which is not only suitable for use in xerography but also useful as a Class D amplifier in motor control and in audio amplifier applications. In one basic embodiment, the converter comprises: switching and commutation means for switching current to a common node from a DC power supply using two switches, two capacitors in series with each other and across the power supply, a series capacitor and inductor for joining the common node to the junction of the two capacitors, an output transformer in parallel with the series capacitor, and control means for operating the switching and commutation means to produce a predetermined voltage across the series capacitor. Preferably, the control means produces a pulse width modulated control signal, regulates the output current, is generally responsive to RMS current flow, has a wide ranging duty cycle, a slow start capability, and includes overcurrent protection, under-voltage lockout protection, and overshoot protection on start-up.

Accordingly, one object of the present invention is to provide a high voltage AC power supply or converter which maintains a relatively constant current output and a uniform sinusoidal waveform over prolonged periods and under differing machine operating conditions.

Another object of the invention is to provide a converter which is lower in cost and does not make use of components that require large operating margins, breakdown potentials, or ratings.

Still another object of the present invention is to provide a converter that does not require expensive circuits to convert instantaneous current values to RMS equivalents.

Yet another object of the present invention is to provide a converter which includes pulse width modulation control combined with overcurrent protection, undervoltage lockout protection, and overshoot protection on start-up.

Another object of the present invention is to provide a converter with a wide ranging duty cycle and a slow start capability.

Finally, it is an object of the present invention to provide a unique four-quadrant buck converter that is adapted to pulse width modulation control.

Other features and advantages of the invention will become clear from the following detailed description, the accompanying drawings, and the claims.

DETAILED DESCRIPTION

While this invention is susceptible of embodiment in many different forms, there is shown in the drawings, and will herein be described in detail, one specific embodiment of the invention having several specific features. It should be understood, however, that the present disclosure is to be considered as an exemplification of the principles of the invention and is not intended to limit the invention to the specific embodiment illustrated and described.

Overview

Figure 1:
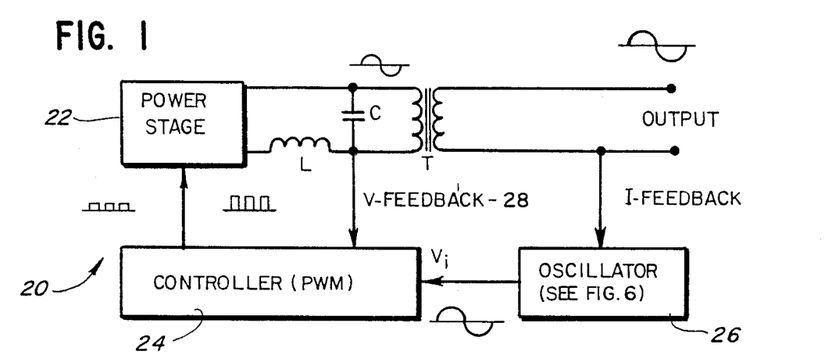
FIG. 1 is a simplified block diagram of the power converter that is the subject of the present invention.

FIG. 1 shows a block diagram of the DC to high voltage AC converter 20 that is the subject of the present invention. The power stage 22 is a four quadrant switching amplifier. The output of the power stage is stepped up by the output transformer "T" to the desired magnitude. The converter 20 employs a PWM Controller 24 having three feedback loops. One loop, the Current Loop, senses the output current and modulates the amplitude of a low frequency Oscillator 26; accordingly, this loop maintains a constant output current. A second loop, the Voltage Loop 28, senses the voltage waveform at the primary of the output transformer "T". This loop maintains the input voltage waveform a pure sinusoid at all times. The third loop (inside block 22) makes it possible to have a two transistor (or any comparable electronic switch) four-quadrant power stage running off a single DC input power supply. The operation of this third loop will be explained later.

Figure 2:
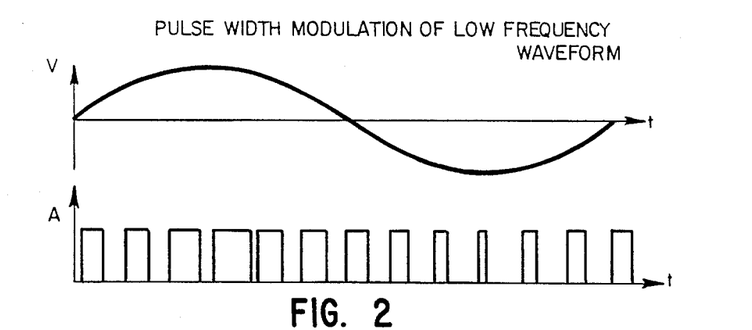
FIG. 2 is a representation of a sinusoidal waveform of the output of the converter of FIG. 1, and the pulse train used to produce it.
Figure 3:
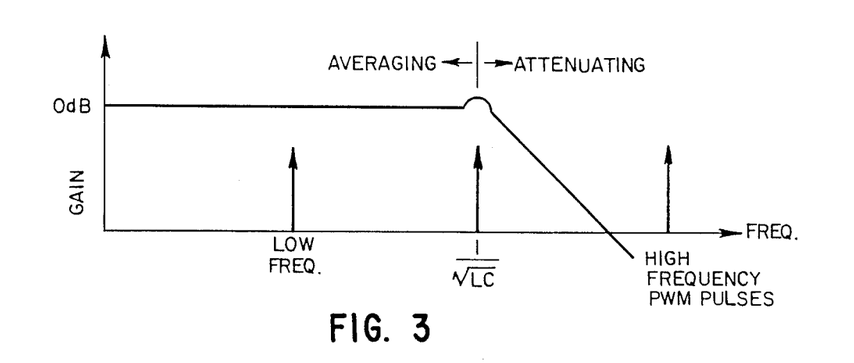
FIG. 3 is a representation of the frequency performance of the converter of FIG. 1.

The output of the low frequency Oscillator 26 is pulse width modulated (See. FIG. 2.) at a much higher frequency by the PWM Controller 24. The pulse width contains both frequency and amplitude information. The high frequency pulses are then fed to the power stage 22 for power amplification. Demodulation is done by an averaging L-C filter (See FIG. 1) with a resonant frequency between the PWM frequency and the sinewave oscillator frequency. Averaging the high frequency pulses extracts the encoded sinewave while attenuating the high frequency pulses (See. FIG. 3).

Figure 4:
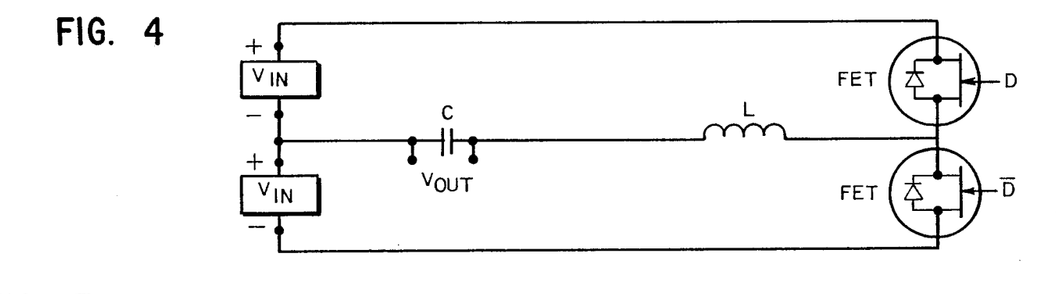
FIG. 4 is a simplified schematic diagram of the power stage of the four-quadrant buck converter of FIG. 1.

FIG. 4 shows a simplified circuit diagram of the Four-Quadrant Power Stage 22. Its performance is that of two back-to-back buck converters joined together with the output filters combined, such that the output AC waveform appears across the capacitor C. The internal drain to source diode in each FET is used as the commutation diode. It requires positive and negative input voltages to operate. This converter can therefore be used as highly efficient AC power amplifier. Since converter stability is important when designing switching power amplifiers, feedback is used to compensate for any distortion due to power stage non-linearity and other variations, such as load and input voltage changes.

Power Stage

Figure 5:
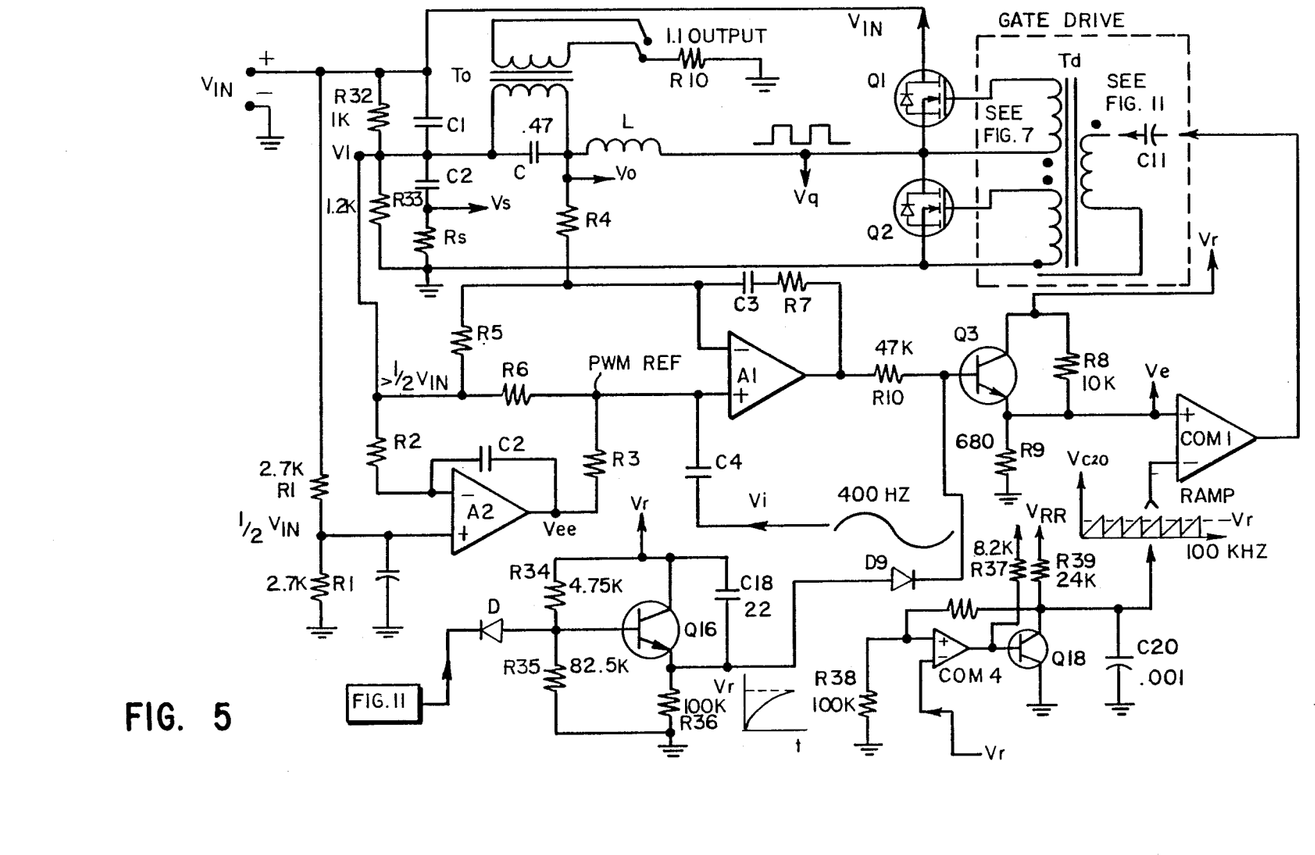
FIG. 5 is a detailed schematic diagram of the converter of FIG. 1, and the associated control circuitry.

Turning to FIG. 5, the Power Stage 22 comprises of a buck type four-quadrant converter running off a single DC input source. This is made possible by using a unique feedback loop. FIG. 5 shows the circuitry. Two capacitors C1 and C2 divide the input voltage essentially in half. This half voltage point Vl, is taken as a "ground"; solid-state switches Q1, Q2, inductor L and capacitor C form a four-quadrant buck converter. The output of converter Vo appears across capacitor C. Note that the output Vo equals Vq times the duty cycle D or (Vq * D) minus Vl. Voltage point Vl is not low enough in impedance to handle much power, and will easily move up or down. This problem is solved by adding a feedback loop to keep Vl constant at all times. Amplifier A2 compares Vl to ½ Vin; if different, an error voltage is fed into the PWM control circuitry 24 which will bring Vl to exactly ½ Vin. Capacitors C1 and C2 should be chosen large enough such that, while the loop is responding, the capacitors will keep Vl from moving much. Thus, Vl will have a ripple which depends on the loop response time and the size of capacitors C1 and C2.

Transistors Q1 and Q2 are driven from a common gate drive transformer Td. When switch Q1 is "on", switch Q2 is "off" and vice versa. Current in switches Q1 and Q2 will flow from drain to source, as well as from source to drain (i.e., internal diode). Thus, the internal source-drain diode must provided for fast recovery. Most new FETs now have fast recovery diodes. In addition, when one source-drain diode is conducting and the opposite transistor turns "on", that source-drain diode will be turned "off" forcefully. Here a failure known as "commutating failure", found in motor drives, can occur. Some new FETs have a "source-drain diode commutating safe operating area" specified (i.e., Motorola's MTP-3055D). Other manufacturers (i.e., Fairchild) are expected to have similar devices available with guaranteed safe commutating areas.

PWM Pulse Width Modulator

A pulse width modulator (PWM) is formed by amplifier A1 and comparator Com1. A 400 Hz input signal Vi is fed via a capacitor C4 into the non-inverting input of A1, with Vl used as a reference. Vi is compared to the output voltage Vo which appears across C (R4 and R5 provide proper scaling), and an error voltage appears at the output of A1. Comparator Com1 compares Ve to a high frequency (i.e., 100 KHz) ramp and outputs a pulse train whose pulse width is proportional to Ve, and thus Vi. The ramp sets the operating frequency. Its amplitude is set from 0 volts to about 5 percent above Vr. (See top of FIG. 10). Transistor Q3 (2N4401) clamps Ve to Vr; thus, the maximum pulse width is limited to approximately 95 percent. Q3 circuitry (i.e., R8 and R9) also limits minimum Ve to approximately 5 percent of Vr, such that the minimum duty cycle is limited to approximately 5 percent.

The high frequency pulses are amplified by switches Q1 and Q2, and demodulated by filter L and C, as explained before. An amplified Vi signal appears across C and the output transformer To steps it up.

The output transformer To cannot tolerate any DC voltage. For this reason the reference voltage for the PWM controller (i.e., amplifier A1) is chosen as Vl (via R6). In the absence of any input signal (i.e., Vi=0), amplifier A1 generates an error voltage if there is any difference between Vl and Vo. Since at DC, amplifier A1 has high gain, any DC voltage across C will generate a large error signal Ve and any DC voltage across C will be minimized.

Amplifier A2 adds a biasing factor to amplifier A1 reference (via resistor R3), only if Vl drifts away from ½ Vin. For Vin=0, the end result is that the voltage across C is zero and Vl equals ½ Vin; this corresponds to a Duty Cycle of 50 percent at the drain (i.e., Vq) of Q2. Since Vo is the average of Vq, we have that Vo=½ Vin which equals Vl; this is the loop equilibrium point. C3 and R7 provide compensation for optimum response. R2 and C2 slow the response of amplifier A2, such that amplifier A1 responds faster, and the effect of amplifier A2 is seen as a biasing effect only.

Oscillator—Variable Amplitude, Fixed Frequency

Figure 6:
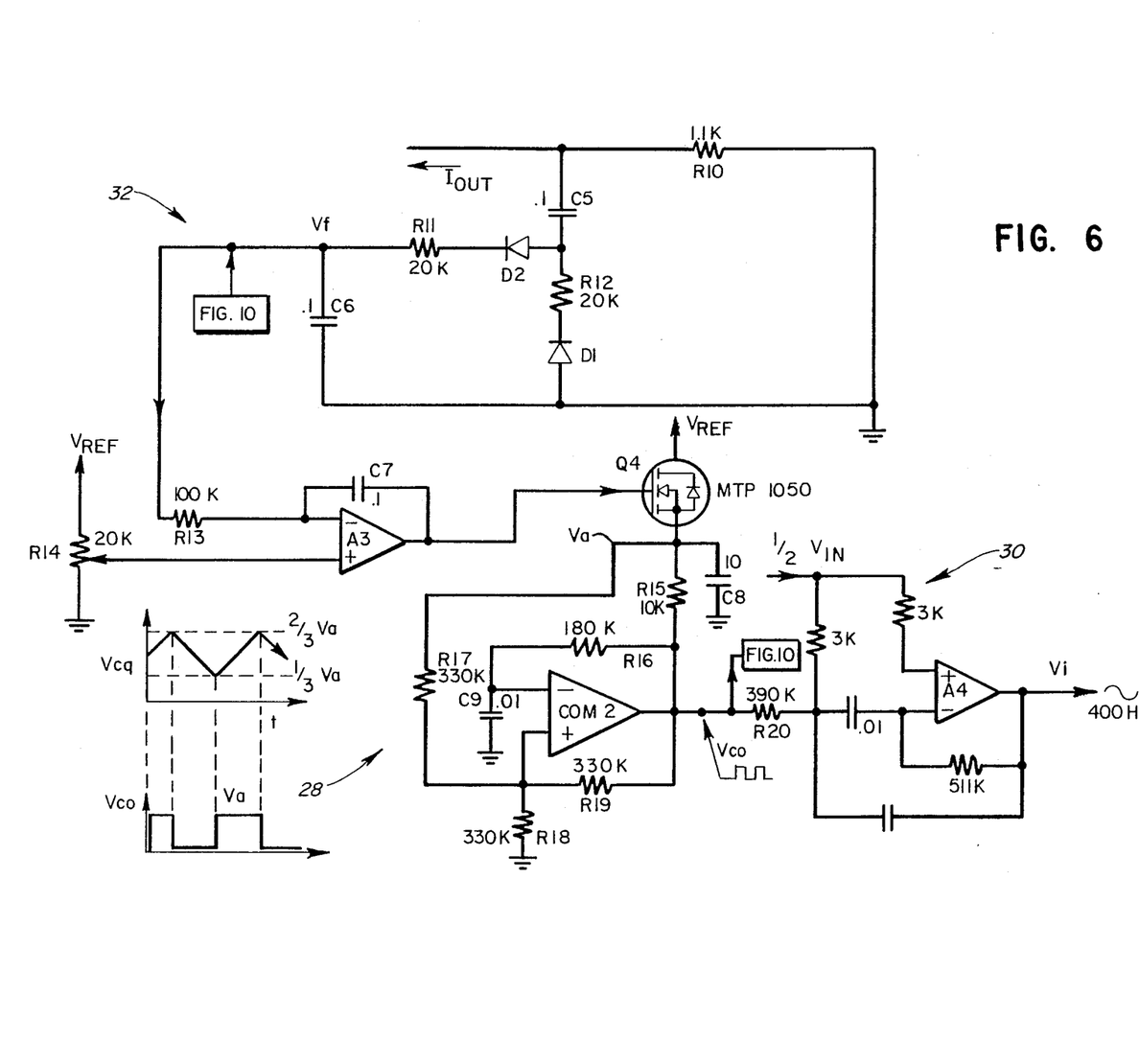
FIG. 6 is a schematic diagram of the Current Regulator, Oscillator, and Band Pass Filter.

FIG. 6 shows the oscillator section and the Current Control Loop. The Oscillator 26 (See FIG. 1) consists of a Squarewave Oscillator 28 feeding into a 400 Hz Bandpass Filter 30. The Bandpass Filter 30 passes only the fundamental frequency and the output is a 400 Hz sinewave. The Squarewave Oscillator 28 uses an amplitude signal provided by a Peak and Averaging Circuit 32.

Comparator Com2 is the heart of the Squarewave Oscillator 28. Assume initially that C9 has no charge.

The inverting input of the comparator Com 2 is low and R15 will take the comparator output up to Va, if R15 is much smaller than R16 and R19. The voltage at the non-inverting input will be ⅔ of Va, since R19 equals R18 and R17, and since R19 and R17 are practically in parallel. Capacitor C9 will charge via R16 until voltage at C9 reaches ⅔ of Va. At this time, comparator Com2 will switch states. Its output will now be low and R19 will be in parallel with R18, dropping the non-inverting input voltage to ⅓ Va. Now, R16 will discharge C9 until its voltage reaches ⅓ Va. Afterwards, the cycle starts over (see the waveforms at the lower left corner of FIG. 6). The voltage at C9 will oscillate between ⅓ and ⅔ of Va. Thus, the comparator output Vco will be a squarewave of amplitude Va. Its frequency will be determined by R16 and C9 (if R16 is much greater than R15), and will be independent of Va, since the comparator Com2 always switches when voltage at C9 reaches ⅓ Va and ⅔ Va.

The Bandpass Filter 30 consists of a standard second order bandpass filter with the following parameters: 400 Hz center frequency, unity Bandpass gain and a 60 Hz 3 dB band width. The Bandpass Filter 30 only passes the fundamental of the squarewave and outputs a sinewave at 400 Hz.

The amplitude of the sinewave is varied to keep the converter-output current $I_{out}$ constant as the load or line changes. This is done with a current loop which controls the voltage Va by operating FET Q4 in the linear region. Since the output current is AC, it first needs to be converted to DC. A RMS to DC converter is preferable, but the cost is relatively high. Using the fact that the RMS value of a rectified AC waveform is somewhere between its average and its peak, a combination of averaging and peak detection can be used when rectifying the output. The output current is sensed by R10. Diodes D1 and D2 established a rectifying doubling circuit. Resistors R11 and R12, and capacitors C5 and C6 provide the proper peak-averaging combination. The voltage Vf at capacitor C6 is a DC equivalent to the RMS value of the output current and is representative of it. Amplifier A3 is the current loop error amplifier. Vf is fed into its inverting input and a reference, set by R14, is fed into its non-inverting input. The output of A3 controls Q4, a FET operated as a variable resistor; therefore, Va is controlled by Amplifier A3. If the load or line changes, A3 will change Va which changes the sinewave oscillator amplitude, which in turn changes the output voltage amplitude and, thus, regulates the output current. Thus, the output current is kept constant (at essentially the RMS value). Potentiometer R14 controls the current set point. R13 and C7 provide proper compensation.

Gate Drive

The Gate Drive for switches Q1 and Q2 must satisfy many requirements. First, it should be low cost. Secondly, it must also prevent switches Q1 and Q2 from conducting at the same time, since they are connected across Vin and simultaneous conduction could be catastrophic. Finally, the duty cycle of each switch should cover a wide range (i.e., from 5 percent to 95 percent). These requirements present a difficult design problem when using a transformer coupled drive.

Figure 7:
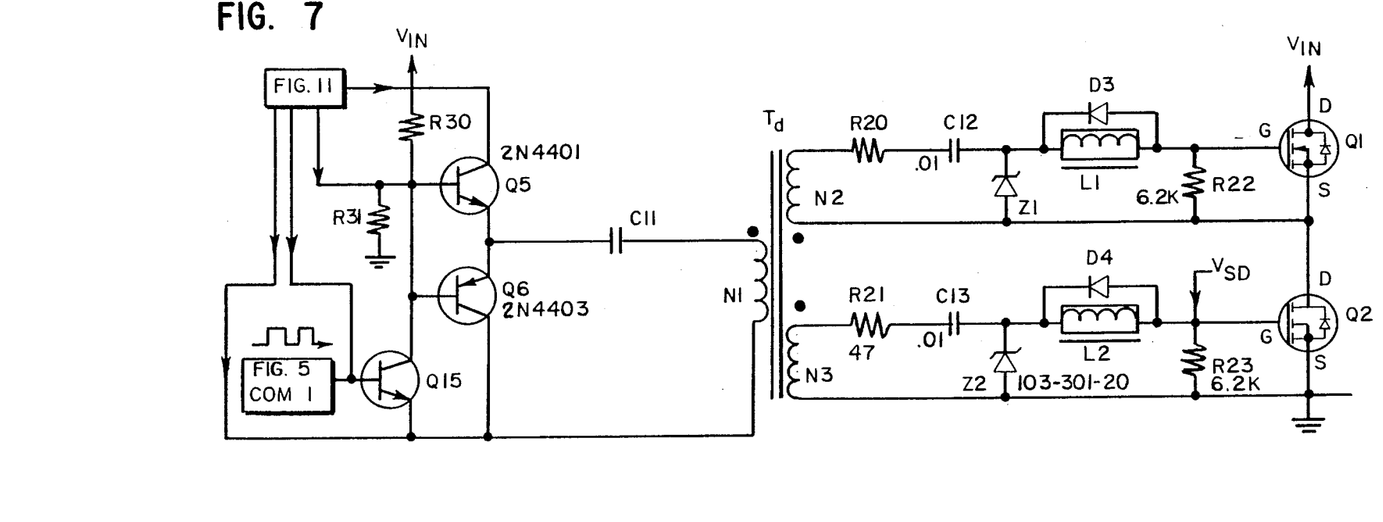
FIG. 7 is a schematic diagram of the Gate Drive.

FIG. 7 shows the Gate Drive used. To solve the problem of simultaneous conduction, which can occur when one FET is being turned "on" and the other is turned "off", a delaying inductor L1 and L2 is added in series with the gate drive circuit. A diode D3 or D4 bypasses the delaying inductor L1 or L2, so that at turn "off" there is no delay. This allows the primary N1 of the drive transformer Td to be driven from a simple "totem pole circuit" (i.e., transistors Q5 and Q6). Its operation will now be described.

Assume that Q5 is "on". This means the "dots" which mark the windings of Td are positive, and Q1 is "off" and Q2 is "on". When Q6 turns "on" the voltage at the Td windings reverses. Q2 is turned "off" immediately, since diode D4 bypasses inductor L2. Q1 is not turned "on" immediately; inductor L1 will delay the gate drive voltage until it saturates, thus delaying Q1 turn-on until Q2 is completely "off". This delay is in the order of 50 nanoseconds only. Thus, the inductors L1 and L2 need only withstand 50 nanoseconds at 10 volts or 500 nano volt-seconds. Using the equation:

$$\text{Saturation Flux density ``B''} = \frac{dV * dT}{A * N}$$

the core area and turns can be found, where:
dV=volts
dT=seconds
A=core area
N=turns.

Figures 8, 8A:
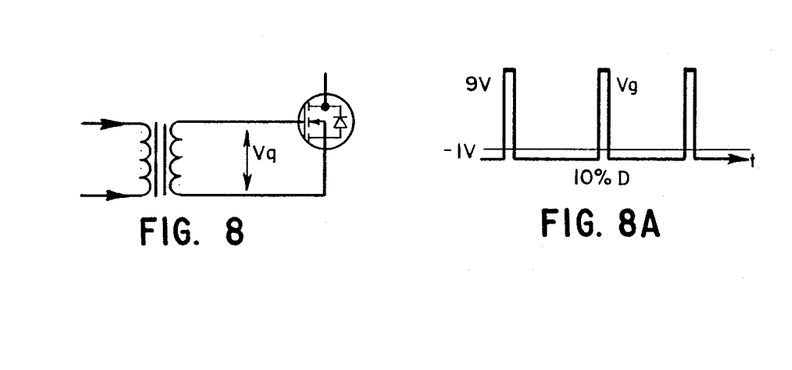
FIGS. 8, 8A, 8B, 9A and 9B depict the operation of the Gate Drive of FIG. 7 in response to changes in duty cycle.
Figure 8B:
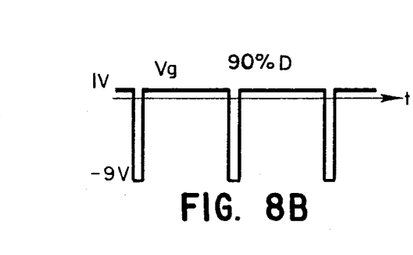

The design problem of providing for a very wide duty cycle range will be explained with the aid of FIG. 8. The gate voltage Vg will vary its positive amplitude as a function of duty cycle. Because any transformer must be volt-second balanced, at low duty cycle (i.e., see FIG. 8A), Vg will be 9 volts high, providing good gate drive. But at a 90 percent duty cycle (see FIG. 8B), the gate drive will only be 1 volt, and the FET will never turn on!

Figure 9A:
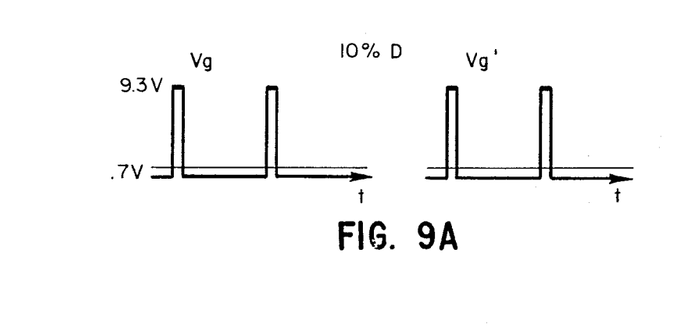
Figure 9B:
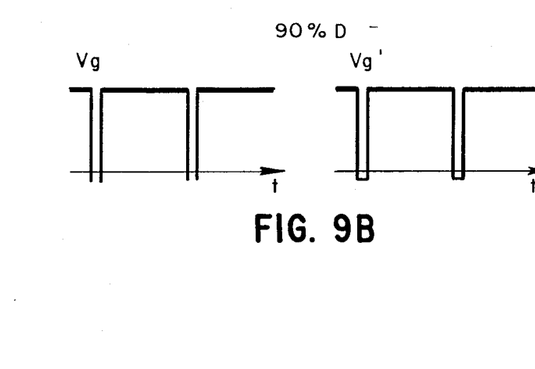

Referring back to FIG. 7, this problem is solved by providing a level shift as a function of duty cycle (i.e., capacitors C12 and C13, and zener diodes Z1 and Z2). First assume a 90 percent duty cycle (i.e., FIG. 8B) at the gate drive of Q2. When Vg is negative, the diode Z2 will conduct and C13 will charge negatively to 8.3 volts. When Vg switches positive (i.e., 1 volt), the 8.3 volts at C3 will add to the 1 volt providing a 9.3 volt gate drive, which is sufficient for turn-on. On the other hand, Q1 will have a 10 percent duty cycle gate drive. When Vg is negative, the diode Z1 will charge C12 to 0.3 volts. When Vg is positive, the 0.3 volts will add to the 9 volts providing a 9.3 volt gate drive Vg'. The end result is that no matter what the duty cycle is, the gate drive voltage will be constant at 9.3 volts (See FIGS. 9A and 9B).

Capacitor C11 blocks the DC preventing the transformer from saturating. The base of transistor Q15 is connected directly to the comparator Com1 output of the PWM (See FIG. 5).

Overcurrent Protection

Returning to FIG. 5, if the output of the output transformer To is shorted, the associated capacitor C will also be shorted, and the PWM control circuitry will "see" no output voltage. Therefore, the PWM control circuitry will attempt to compensate for this by going to either minimum or maximum duty cycle. The inductor L will then saturate after several switching cycles, inducing high currents in Q1 and Q2. Thus, over current protection is needed.

Figure 10:
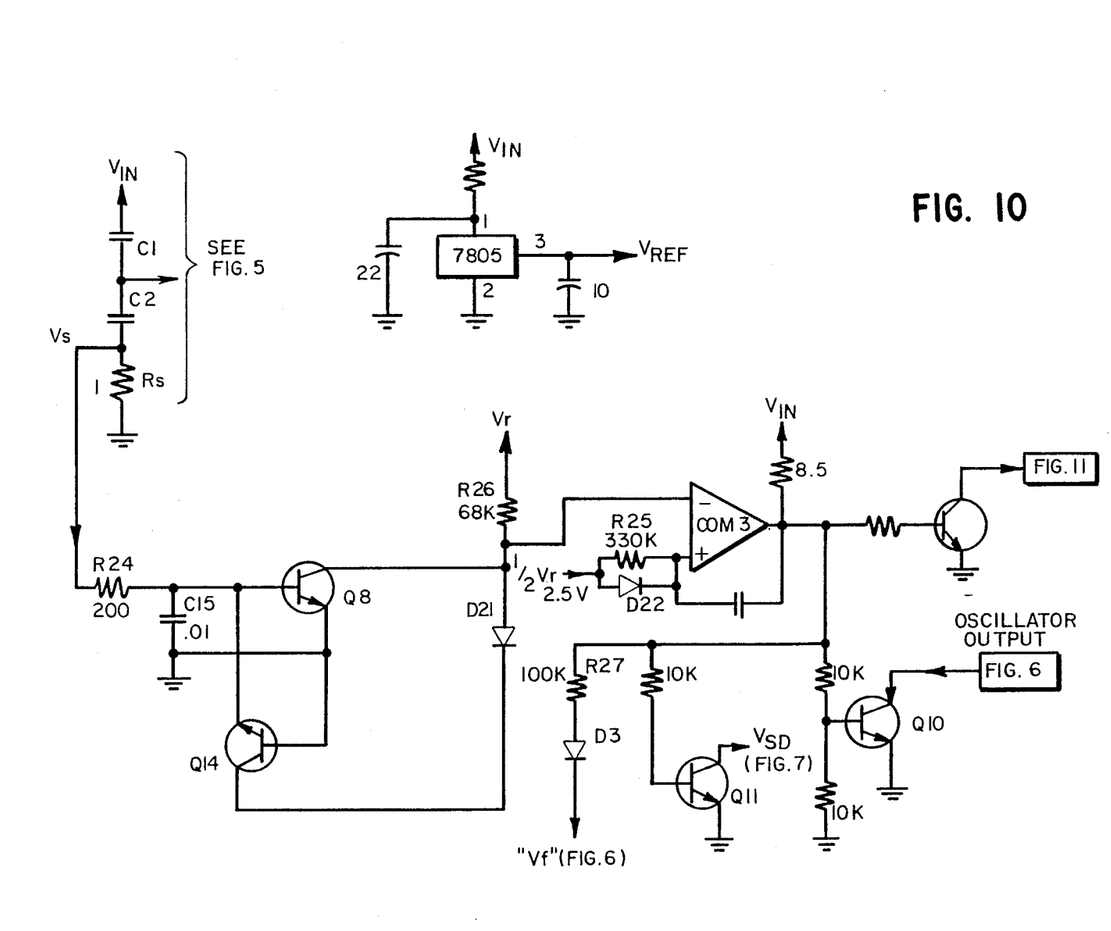
FIG. 10 is a schematic diagram of the Overcurrent Protection section of the converter.

FIG. 10 shows the Overcurrent Protection Circuitry. Resistor Rs senses (See FIG. 5) the current at the ground leg of capacitor C2. Sensing it here has two advantages. The sensed voltage is referenced to ground and the sensed current is approximately equal to ½ the current through L resulting in lower losses. The voltage developed at Rs is filtered by resistor R24 and capacitor C15; this eliminates high frequency noise spikes. The sensed voltage Vs, which proportional to the inductor current Is, is then fed to the base-emitter junctions of transistors Q8 or Q14. If the sensed voltage exceeds approximately 0.6 volts, Q8 or Q14 will turn "on". This triggers comparator Com3 which is configured as a monostable. If Vs is positive, Q8 will turn "on"; if Vs is negative the Q14 will turn "on". Thus, the inductor current is sensed in either direction. A diode D21 in series with Q14 collector prevents Q14 collector from going negative once it turns "on". The monostable is achieved by using positive feedback. The inverting input of Com3 is normally higher than the non-inverting input; therefore, the comparator output is normally "low". When Q8 or Q14 turns "on", the inverting input is pulled low causing the comparator output to switch "high". C16 then pulls the non-inverting input higher than Vr, for a time determined by the values of resistor R25 and capacitor C16; this sets the monostable duration. A diode D22 in parallel with resistor R25 quickly charges C16 back to ½ Vr, so it is ready for the next trigger pulse.

The output of the monostable Com3 drives transistors Q10 and Q11, and FET Q4 (see FIG. 6) which are used to disable other circuits and thereby achieve overcurrent protection:

1. The output of the Squarewave Oscillator (Com2 in FIG. 6) is disabled by Q10;
2. Main FET Q2 is turned "off"; Q11 shorts its gate to ground (see FIG. 7).
3. Diode D3 and R27 charge capacitor C6 (see FIG. 6) providing a "false" current feedback voltage Vf, such that the Squarewave Oscillator input voltage Va (via A3 and Q4) will drop to "0", and during restart it will ramp up slowly.
4. Q15 disables the gate drive to Q1 and Q2 by disabling power to transistors Q5 and Q6 of FIG. 7. Refer to the description of the Undervoltage Lockout circuit (FIG. 11) which is discussed below.

Undervoltage Lockout

In one specific application of the invention, the power supply has provision for a safety input signal called "INTERLOCK". When this input is low, the power supply is disabled. When it is at 24 volts, it enables the supply. This INTERLOCK input is connected, as shown on FIG. 11, to a transistor Q12 to provide the power for the gate drive Vd. With the INTERLOCK input low, Vd is at zero volts and the gate drive looses power and the supply shuts down. There is one problem; as Vd is rising, the gate drive voltage may be insufficient, causing poor gate drive.

Figure 11:
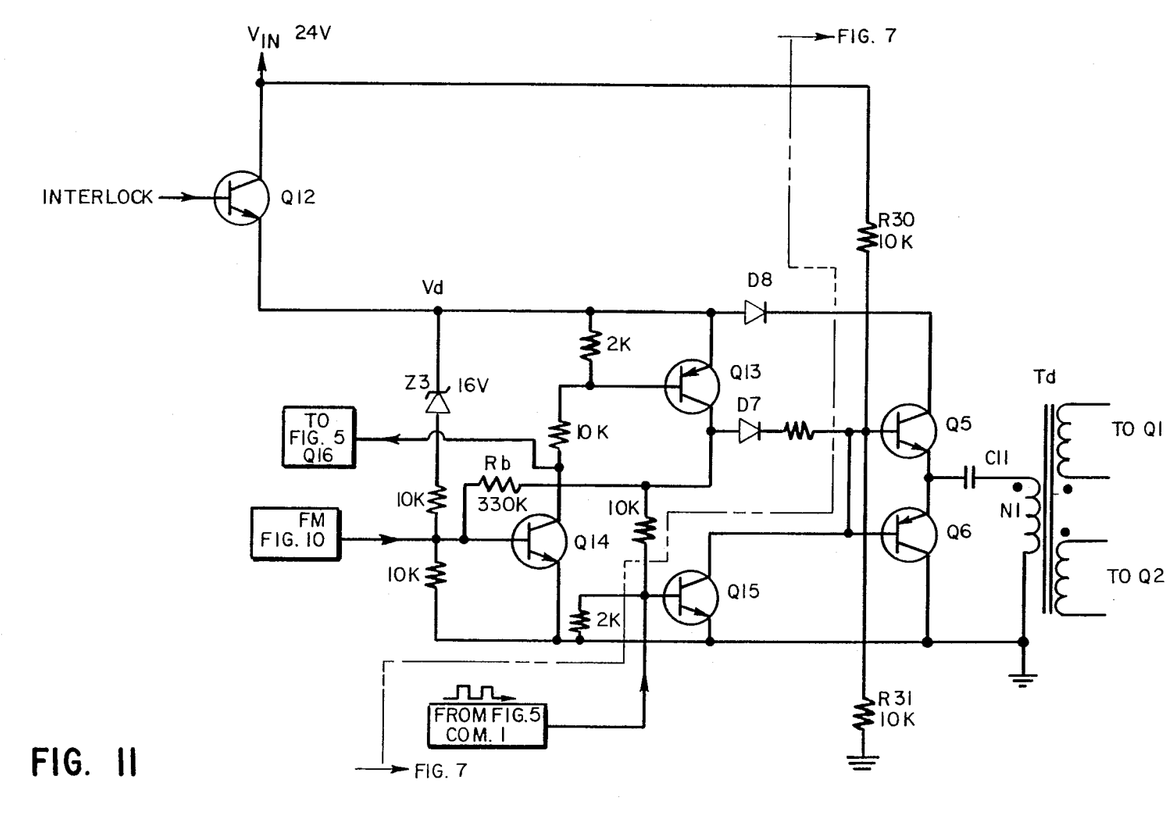
FIG. 11 is a schematic diagram illustrating the operation of the Under Voltage Lockout section of the converter of FIG. 1.

Therefore, the gate drive should be disabled until Vd is high and stable. This is done as follows: Zener diode Z3 keeps transistor Q14 "off", until Vd is greater than 18 volts. When Q14 turns "on", Q13 is turned "on" and Q13 collector is pulled up to Vd. Resistor Rb provides hysteresis by providing more Q14 base drive, preventing any oscillation. Q13 then supplies base drive to Q15, as well as Q5 and Q6, enabling the gate drive.

Resistors R30 and R31 precharge capacitor C11 to ½ Vin. To see why this is needed, suppose that C11 is fully discharged, and Q5 and Q6 start switching at 50 percent duty cycle. Eventually, C11 will charge to ½ Vin and the voltage at the primary winding N1 of the drive transformer Td will be an AC squarewave. But, while C11 is charging, the voltage at N1 will be unbalanced, being more positive than negative. This causes the gate drive (at switches Q1 and Q2) to be unbalanced also, and it is possible to have both switches Q1 and Q2 "on" at the same time. Precharging C11, before the gate drive is enabled, will prevent this problem. Diodes D7 and D8 prevent C11 from discharging when Vg is low. Note that the capacitor precharge level must be related to the initial duty cycle (i.e., 50 percent duty cycle, 50 percent precharge), to prevent initial volt seconds imbalance at Td, which brings us to the next protection circuit.

Slow Start—50 Percent Initial Duty Cycle

As was mentioned before, the 50 percent duty cycle operation corresponds to no pulse width modulation for a four-quadrant switching amplifier. So, ideally, the initial duty cycle should be 50 percent and then increase or decrease according to the input signal.

FIG. 5 shows a circuit that provides 50 percent initial duty cycle. Vl is set higher than ½ Vin by having resistor R33 about 20 percent higher than R32. With Vl higher than ½ Vin, the output of amplifier A2 will be "low", causing the output of amplifier A1 also to go "low". Q3 will be "off" and the duty cycle will be minimum. Because Vl is unbalanced (i.e., greater than ½ Vin) every time at start-up, the duty cycle will be minimum.

The voltage at the emitter of transistor Q16 is set by R34 and R35; therefore, the error voltage Ve (via diode D9) is clamped to approximately ½ Vr which forces the initial duty cycle to equal 50 percent. As the power supply is turned "on", Q16 is turned "off" (i.e., its base grounded) through a connection (via diode D) to the undervoltage lockout circuit previously described (i.e., Q14 collector in FIG. 11). Thereafter, capacitor C18 will slowly charge to Vr via R36. This lets Ve slowly go "low"; thus, the duty cycle is slowly decreased until Vl equals ½ Vin at which time the voltage loop is closed.

Apart from the initial duty cycle having to be matched to the gate drive capacitor C11 (see FIG. 11) voltage precharge, 50 percent initial duty cycle prevents output overshoot at turn-on. Suppose Vl is more than ½ Vin (even 0.01 volts!), and suppose the slow start circuit is not present; the output of A2 will be "low", the output of A1 will be "low", and error voltage Ve will also be "low". The initial duty cycle will be minimum, about 5%. Transistor switch Q2 will be "on" most of the time; since the PWM voltage loop has a finite response time, many high frequency switching cycles will pass before the voltage loop is closed. With Q2 mostly "on", L and the primary winding of To will see a DC voltage approximately equal to ½ Vin. The output transformer To will then couple this voltage to the output, until it saturates. Thus, at the output we would have a large transient at turn-on. Inductor L will also saturate endangering Q1 and Q2. As Vl is brought equal to ½ Vin, the voltage loop will close and duty cycle will reach 50%. By contrast with the slow start circuit in place, the loop starts at 50 percent (not at some significantly lower value), decreases some to set Vl, equal to ½ Vin, and returns to 50 percent closed loop equilibrium.

Capacitor C18 and resistor R36 are chosen large enough, such that the duty cycle lowering is slower than the loop response time, preventing the inductor L and the output transformer To from saturating. The output voltage overshoot at turn-on is also reduced by an order of magnitude.

Ramp Generator

The ramp generator is diagramed in the lower right corner of FIG. 5. Assume C20 is initially discharged, the non-inverting input to comparator Com4 is "low", and the inverting input is at reference voltage Vr. Therefore, the Com4 output is "low" and transistor Q18 is "off". Capacitor C20 then charges through resistor R39. Vrr is chosen much higher than Vr, so that the C20 charging current is relatively constant and the voltage at C20 increases linearly. When the voltage at the non-inverting input of Com4 reaches Vr, the comparator switches "high" and Q18 discharges C20 completely. Resistors R37 and R38 are chosen, such that the peak voltage at C20 is approximately 5 percent higher than Vr. Having ramp peak voltage higher than Vr limits the maximum duty cycle of the PWM control circuitry (here that limit is approximately 95 percent). The ramp frequency is set by the values of capacitor C20 and resistor R39.

CONCLUSION

From the foregoing description, it will be appreciated that the invention represents a significant improvement in cost reduction and performance. It is powered by a single DC voltage, thus directly replacing a push-pull type converter. Its output voltage is essentially a non-distorted sinewave at any amplitude. Moreover, by reducing in size the low pass L-C filter, the overall cost is reduced by an order of magnitude. In addition, the electronic power switches Q1 and Q2 require a voltage rating five times lower than an equivalent push-pull type converter, thereby further reducing cost.

From the foregoing description, it will also be observed that simple variations and modifications may be effected without departing from the true spirit and scope of the novel concepts embodied in the present invention. For example, those skilled in the art will know and understand that the heart of the converter is basically a Class D amplifier. Moreover, there are many other applications, as a motor control and as a very efficient Audio Amplifier. Thus, it should be understood that no limitation with respect to the specific apparatus illustrated herein is intended or should be inferred. It is, of course, intended to cover by the appended claims all such modifications as fall within the scope of the claims.

I claim:

1. A high voltage converter, comprising:
   (a) switching and commutation means, adapted to be disposed across the output terminals of a power supply and comprising at least two switch means in series with each other, for switching current therethrough;
   (b) capacitor means comprising two capacitors in series with each other and across said power supply;
   (c) a series capacitor and a series inductor in series with each other for joining the common node between said two capacitors to the common node between said two switch means;
   (d) transformer means across said series capacitor for providing a high voltage AC output; and
   (e) control means, using as a voltage reference the voltage at said common capacitor node and using a voltage controlled oscillator output signal, for operating said switching and commutation means to maintain the current output generally constant as load changes, said control means including:
   a rectifying and doubling circuit for producing from said AC current a DC voltage whose value is between the average value of the AC waveform and the peak value of the AC waveform, said DC voltage being used to control the output amplitude of said voltage controlled oscillator, whereby the amplitude of the oscillator output is generally representative of the RMS value of said AC current.

2. The converter of claim 1, wherein each of said two switches have a commutation diode across it.

3. The converter of claim 1, wherein said power supply is a high voltage DC source of power and further including comparator means, using said voltage at said common capacitor node and a voltage derived from the output of said power supply, for biasing the output of said control means.

4. The converter of claim 3, wherein said derived voltage has a magnitude approximately one-half the magnitude of the voltage across said power supply.

5. The converter of claim 4, wherein said control means further comprises:
   a comparator which provides signals to drive said switching and commutation means, said comparator having a ramp voltage at its inverting input and a voltage at its non-inverting input which is obtained from voltage controlled oscillator and which is clamped to a reference voltage; and
   means for providing a slowly decreasing voltage and adding said decreasing voltage to said non-inverting input, whereby said comparator output slowly decreases and said duty cycle decreases until the voltage at said junction is approximately equal to said one-half voltage.

6. The converter of claim 4, wherein derived voltage is obtained from two generally equal resistors which are in series with each other and across said power supply, said derived voltage being obtained at the common node between said two generally equal resistors.

7. The converter of claim 6, further including two resistors of unequal value in series with each other and across said power supply, said two unequal resistors being joined together at a common node which is connected to the common node between said two capacitors,
said comparator means including a voltage comparator which has at its inverting input the voltage at said capacitor node and has at is non-inverting input the voltage at said generally equal resistor node, whereupon energization of said power supply the bias is at a minimum.

8. The converter of claim 1, wherein said switching and commutation means comprises two field effect transistors which are in series with each other and which have fast recovery diodes therein.

9. The converter of claim 1, further including overcurrent protection means for preventing the inducement of high current in said switching and commutation means, said overcurrent protection means including means for disabling said oscillator in the event said current exceeds a predetermined value.

10. The converter of claim 1, wherein said rectifying and doubling circuit comprises:

(a) a first series circuit of a capacitor, resistor, and diode which is in parallel with a load resistor through which said output current flows; and (b) a second series circuit of a second capacitor, a second resistor, and a second diode, said second series circuit being in parallel with said resistor and diode, the voltage across said second capacitor being representative of the RMS value of said output current.

11. The converter of claim 1, wherein said switching and commutation means further comprises a drive transformer having two secondary windings which are wound in opposition to each other for gating said two switch means alternatively, and wherein said control means includes level shift means for providing a shift in the level of the voltage used to gate each switch means as a function of its duty cycle, said level shift means comprising at least one capacitor in series with a secondary winding of said drive transformer and zener diode means in parallel with the series combination of said one capacitor and said one secondary winding.

12. The converter of claim 11, wherein each switch means is a FET whose gate is triggered by the voltage across said zener diode means, and wherein the primary winding of said drive transformer is operated in response to said control means, said level shift means comprising means for producing a voltage at said gate.

13. The converter of claim 11, further including a circuit of a resistor joined at a node to the parallel combination of a diode and an inductor, said circuit being in parallel with said zener diode means, the voltage across said resistor being used to gate said switch means.

14. The converter of claim 1, further including:
(f) overcurrent protection means for protecting said switching and commutation means in the event the current out of said transformer means exceeds a predetermined value.

15. The converter of claim 14, wherein at least one of said two switch means comprises at least one field effect transistor (FET), and wherein said overcurrent protection means includes means for turning said one FET "off" in response to said current out of said transformer exceeding said predetermined value.

16. The converter of claim 15, wherein said overcurrent protection means shorts the gate of said one FET to ground in response to said current out of said transformer exceeding said predetermined value.

17. The converter of claim 14, wherein said overcurrent protection means includes means for shutting off said voltage controlled oscillator in response to said current out of said transformer exceeding said predetermined value.

18. The converter of claim 17, wherein said voltage controlled oscillator comprises a square wave oscillator and a bandpass filter for passing the fundamental of said square wave oscillator, and wherein the output of said oscillator is shorted to ground by said overcurrent protection means in response to said current out of said transformer exceeding said predetermined value.

19. The converter of claim 1, further including:
(f) an undervoltage lockout circuit for enabling said switching and commutation means by providing a voltage thereto after the voltage from said power supply has exceeded a predetermined value.

20. The converter of claim 19, wherein said undervoltage lockout circuit comprises:
(a) a switch to supply a voltage to a bus;

(b) zener diode means for providing voltage from said bus to power said switching and commutation means after said bus voltage has exceeded said predetermined value.

21. The converter of claim 19, further including: a timing circuit of a timing resistor connected to a timing capacitor at a timing node, said timing resistor and timing capacitor being disposed between a ground and a reference voltage; and shorting means, operated in response to said voltage provided by said undervoltage lockout circuit, for shorting said timing capacitor when said provided voltage is low, whereby when said provided voltage goes high, the voltage at said timing node decreases from a value generally equal to said reference voltage in accordance with the RC time constant of said timing circuit.

22. The converter of claim 21, wherein said control means includes voltage clamping means whose output is operatively connected to said switching and commutation means and whose input is operatively connected to said timing node, for providing a voltage clamping function to said switching and commutation means.

23. The converter of claim 22, wherein the output of said control means is also operatively connected to the input of said clamping means.

24. The converter of claim 23, wherein said control means comprises:
greater voltage reference means, across said power supply, for producing a voltage which is greater than one-half of the voltage across said power supply; and
comparator means, having an inverting input operatively connected to the output of said greater voltage reference means and having a non-inverting input operatively connected to a voltage derived from two generally equal resistors in series with each other and operatively connected to the output of said supply, for applying a bias voltage to said clamping means.

25. The converter of claim 19, wherein said switching and commutation means comprises:
(a) a drive transformer;
(b) totem pole means, operated by said undervoltage lockout circuit and said control means, for supplying a charging voltage from said power supply to a capacitor which is in series with the primary of said drive transformer before said control means becomes effective, said charging voltage having a magnitude approximately one-half of said power supply voltage.

26. The converter of claim 1, wherein said control means includes
means for supplying a false current feedback voltage to shut off said voltage controlled oscillator in the event of an overcurrent condition and for restarting said voltage controlled oscillator by ramping it up from a generally off condition.

27. The converter of claim 1, said control means further including
slow start means for slowly starting said control means such that the initial duty cycle will be approximately fifty percent and then increase or decrease according to the voltage at said node between said two capacitors in series with each other.

28. The converter of claim 27, wherein said switching and commutation means further comprises:
(a) two generally equal resistors in series with each other across said power supply;

(b) two transistors connected at a common junction in a totem pole across said power supply with their bases joined to the node between said two generally equal resistors and operatively connected to the output of said control means; and (c) a drive transformer, having one end of its primary winding joined to said common junction of said two transistors by a capacitor, for supplying at least two oppositely wound secondary windings, said capacitor being charged to approximately one-half of the voltage of the power supply while said control means is being started.

29. The converter of claim 1, wherein said switching and commutation means includes drive transformer means for driving said two switch means, said drive transformer means having a primary winding which has one end coupled by a coupling capacitor to the output of said control means, said control means including means for precharging said coupling capacitor on start-up to avoid said two switch means being energized at the same time.

30. The converter of claim 29, wherein said switching and commutation means comprises:

(a) two resistors in series with each other across said power supply; and (b) two transistors connected at a common junction in a totem pole across said power supply with their bases joined to the node between said two resistors and operatively connected to the output of said control means, said one end of said primary winding being joined to the said common junction of said two transistors by said coupling capacitor.

31. The converter of claim 29, wherein said control means comprises:

a comparator which provides signals to drive said switching and commutation means, said comparator having a ramp voltage at its inverting input and a voltage at its non-inverting input which is clamped to a reference voltage; and means for providing, on a start-up of said converter, a slowly decreasing voltage and for adding said decreasing voltage to said non-inverting input, whereby said comparator output slowly decreases and said duty cycle initially decreases.

32. An amplifier, comprising:

(a) a four-quadrant buck converter having switching and commutating means for switching and commutating current to and from a common node and having a common leg of an inductor in series with an output capacitor, one end of said common leg being joined to said common node;

(b) one power supply for providing a positive voltage output signal and a negative voltage output signal to the other end of said common leg and to said means for switching and commutating current to and from a common node;

(c) an output transformer whose primary is connected across said output capacitor; and (d) pulse width modulated control means for operating said switching and commutating means to produce a predetermined voltage across said output capacitor and for regulating the current out of said transformer, said control means operating in response to voltage signals from each side of said output capacitor, a high frequency ramp voltage, an internal oscillator voltage, and a voltage reference signal, said internal oscillator voltage being combined with said voltage signals from said output capacitor and said voltage reference signal to obtain an error voltage, said error voltage being combined with a high frequency ramp voltage to obtain a control voltage.

33. The amplifier of claim 32, wherein said control means includes rectifying and doubling circuit means for producing, from the AC current flowing from said output transformer, a DC control voltage whose value is between the average value of the AC waveform and the peak value of the AC waveform; and wherein said internal oscillator amplitude is a function of said DC control voltage.

34. The amplifier of claim 33, wherein said control means includes means for sensing the current flowing through said primary of said output transformer and supplying a false DC control voltage to said internal oscillator to lower the amplitude of the output of said internal oscillator in the event said current flowing through said primary of said output transformer exceeds a predetermined value.

35. The amplifier of claim 32, wherein said control means includes overcurrent protection means for shutting off the operation of switching and commutation means in the event the current flowing through said primary of said output transformer exceeds a predetermined value.

36. The amplifier of claim 35, wherein said overcurrent protection means includes means for shutting off said internal oscillator in the event that the current flowing through said primary of said output transformer exceeds said predetermined value of current.

37. The amplifier of claim 36, wherein said control means includes means for restarting said internal oscillator by ramping it up at a predetermined rate from its shut off condition after said current flowing through said primary of said output transformer has dropped below said predetermined value.

38. The amplifier of claim 32, further including undervoltage lockout means for enabling said switching and commutation means by providing a voltage thereto after a voltage from said power supply has exceeded a predetermined value.

39. The amplifier of claim 38, further including: a timing circuit of a timing resistor connected to a timing capacitor at a timing node, said timing resistor and timing capacitor being disposed between a ground and a reference voltage; and shorting means, operated in response to said voltage provided by said undervoltage lockout means, for shorting said timing means for providing on start-up of said amplifier a slowly decreasing voltage and for adding said decreasing voltage to said non-inverting input, whereby the duty cycle of said comparator output initially slowly decreases.

40. The amplifier of claim 39, wherein said control means includes voltage clamping means, whose output is operatively connected to said switching and commutation means and whose input is operatively connected to said timing node, for providing a voltage clamping function to said switching and commutation means.

41. The amplifier of claim 40, wherein the output of said control means is also operatively connected to the input of said clamping means.

42. The amplifier of claim 40, wherein said control means includes:

greater voltage reference means, across said power supply, for producing a voltage which is greater than one-half of the voltage across said power supply; and comparator means, having an inverting input operatively connected to the output of said greater voltage reference means and having a non-inverting input operatively connected to a voltage derived from two generally equal resistors in series with each other and operatively connected to the output of said supply, for applying a bias voltage to said clamping means.

43. The amplifier of claim 38, wherein said switching and commutation means comprises:
(a) a drive transformer;
(b) totem pole means, operated by said undervoltage lockout means and said pulse width modulated control means, for supplying a charging voltage from said power supply to a capacitor which is in series with the primary of said drive transformer before said pulse width modulated control means becomes effective, said charging voltage having a magnitude approximately one-half of said power supply voltage.

44. The amplifier of claim 38, wherein said switching and commutation means comprises:
(a) two generally equal resistors joined together at a common node to be in series with each other across said power supply;
(b) two transistors connected at a common output junction in a totem pole across said power supply with their bases joined to said node between said two generally equal resistors and operatively connected to the output of said control means; and
(c) a drive transformer, having one end of its primary winding joined to said common output junction by a capacitor, for supplying voltage to at least two oppositely wound secondary windings in response to the voltage applied to said two transistor bases, said capacitor being charged to approximately one-half of the voltage of the power supply while said control means is being started.

45. The amplifier of claim 32, wherein said control means comprises:
a comparator which provides signals to drive said switching and commutating means, said comparator having said ramp voltage at its inverting input and said error voltage at its non-inverting input which is clamped to a reference voltage; and
means for providing on start-up of said amplifier a slowly decreasing voltage and for adding said decreasing voltage to said non-inverting input, whereby the duty cycle of said comparator output initially slowly decreases.

46. The converter of claim 45, wherein said control means includes slow start means for starting said switching and commutation means with an initial duty cycle of approximately fifty percent.

47. A high voltage amplifier, comprising:
(a) the functional equivalent of two back-to-back buck converters having a common output filter of an inductor in series with a capacitor, having one DC power supply and having at least two switches for switching power to said inductor and capacitor;
(b) a transformer across said capacitor; and
(c) controller means, operating in response to the current flowing out of said transformer and the voltage across said capacitor, for selectively operating said switches to maintain a selected current flow, said controller means comprising an oscillator and a high frequency ramp voltage generator to produce a pulse width modulated control signal to operate said switches, said capacitor and inductor comprising an averaging filter whose resonant frequency is between the frequency of said controller and said oscillator frequency.

48. A high voltage amplifier, comprising:
(a) the functional equivalent of two back-to-back buck converters having a common output filter of an inductor in series with a capacitor, having one DC power supply and having at least two switches for supplying power to said inductor and capacitor;
(b) a transformer across said capacitor; and
(c) controller means, operating in response to the current flowing out of said transformer and the voltage across said capacitor, for selectively operating said switches to maintain a selected current flow, said controller means comprising: oscillator means, operated in response to a signal approximating the RMS value of said current flowing out of said transformer, for producing control voltage whose amplitude is a function of said current flowing out of said transformer; and means, combining said control voltage and a signal representative of said voltage across said capacitor, for producing an error voltage to control the operation of said switches.

49. The amplifier of claim 48, wherein said controller means includes: means for producing a ramp voltage; means, combining said ramp voltage and said error voltage, for producing a pulse width modulated signal to selectively operate said switches.

50. The amplifier of claim 49, further including means, adding to said error voltage a voltage whose value decreases from a preset value to a predetermined lower value, for initially selectively operating said switches with a duty cycle which initially gradually decreases from approximately fifty percent and which changes thereafter according to the voltage across said capacitor.

51. The amplifier of claim 48, further including means for slowly starting said oscillator means.

52. A high voltage amplifier, comprising:
(a) the functional equivalent of two back-to-back buck converters having a common output filter of an inductor in series with a capacitor, having one DC power supply and having at least two switches for supplying power to said inductor and capacitor;
(b) a transformer across said capacitor; and
(c) controller means, operating in response to the current flowing out of said transformer and the voltage across said capacitor, for selectively operating said switches to maintain a selected current flow, said controller means comprising: means for providing one voltage signal which is generally equal to one-half of the voltage across said DC power supply; means, connected to one side of said capacitor for producing another voltage signal, which is generally greater than one-half of the voltage across said DC power supply; and means for combining said voltage signals to bias the operation of said converter to produce on the other of said capacitor an output voltage whose value is generally equal to one-half of the voltage across said DC power supply.

53. A high voltage amplifier, comprising:

(a) the functional equivalent of two back-to-back buck converters having a common output filter of an inductor in series with a capacitor, having one DC power supply and having at least two switches for supplying power to said inductor and capacitor;
(b) a transformer across said capacitor; and
(c) controller means, operating in response to the current flowing out of said transformer and the voltage across said capacitor, for selectively operating said switches to maintain a selected current flow, said switches being operated in response to a drive transformer whose primary winding is coupled to the output of said controller means by a coupling capacitor, said controller means including means for charging said coupling capacitor to a value approximately equal to one-half of the voltage across said DC power supply before said switches are operated.

* * * * *